United States Patent
Powell (10) Patent No.: US 6,993,643 B2
(45) Date of Patent: Jan. 31, 2006

(54) METHOD AND SYSTEM OF DYNAMIC VIDEO DRIVER SELECTION ON A BOOTABLE CD VIA SYMBOLIC LINKS

(75) Inventor: Paul Anthony Powell, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 10/007,425

(22) Filed: Dec. 3, 2001

(65) Prior Publication Data

US 2003/0105947 A1 Jun. 5, 2003

(51) Int. Cl.
G06F 9/00 (2006.01)

(52) U.S. Cl. ......................................................... 713/1
(58) Field of Classification Search .................... 713/1
See application file for complete search history.

(56) References Cited

U.S. PATENT DOCUMENTS

| | | | |
|---|---|---|---|
| 5,313,631 A * | 5/1994 | Kao ............................ 707/204 |
| 5,325,532 A | 6/1994 | Crosswy et al. |
| 5,463,766 A | 10/1995 | Schieve et al. |
| 5,544,318 A * | 8/1996 | Schmitz et al. .............. 709/207 |
| 5,581,766 A | 12/1996 | Spurlock |
| 5,692,190 A | 11/1997 | Williams |
| 5,727,213 A | 3/1998 | Vander Kamp et al. |
| 5,732,266 A | 3/1998 | Moore et al. |
| 5,802,365 A * | 9/1998 | Kathail et al. .............. 719/321 |
| 5,951,684 A | 9/1999 | Jeon |
| 6,085,318 A | 7/2000 | Vander Kamp et al. |
| 6,189,050 B1 * | 2/2001 | Sakarda ........................ 710/18 |
| 6,208,326 B1 | 3/2001 | Frederick et al. |
| 6,292,941 B1 * | 9/2001 | Jollands ....................... 717/176 |
| 6,321,219 B1 * | 11/2001 | Gainer et al. ................... 707/3 |
| 6,327,703 B1 * | 12/2001 | O'Donnell et al. .......... 717/162 |
| 6,385,496 B1 * | 5/2002 | Irwin et al. ..................... 700/87 |
| 6,529,966 B1 * | 3/2003 | Willman et al. .............. 710/10 |
| 6,577,324 B1 * | 6/2003 | Palmer et al. ............... 345/705 |
| 6,681,324 B1 * | 1/2004 | Anderson ........................ 713/1 |
| 6,711,630 B2 * | 3/2004 | Dubal et al. .................... 710/8 |
| 2003/0120766 A1 * | 6/2003 | Ishiyama et al. ............ 709/223 |

OTHER PUBLICATIONS

Nemeth, Evi et al., UNIX System Adminstration Handbook, 1995, Prentice Hall, 2nd Edition, pp. 61-62.*
Research Disclosure, "Combination Boot Method for Windows 95", Dec. 1998, N. 41613, p. 1575.

* cited by examiner

Primary Examiner—Lynne H. Browne
Assistant Examiner—Tse Chen
(74) Attorney, Agent, or Firm—Martin J. McKinley; Dillon & Yudell LLP (57) ABSTRACT

A method, system, and program product for enabling selection of appropriate, available resources for a hardware component of a data processing system during system boot via a read only medium. The method comprises various steps including first initiating a boot process from the read only medium on the data processing system. The type of hardware component is then detected and, responsive to the detection of a specific component type, an object of a symlink file located on RAM is dynamically set to reflect the particular resource required for optimal operation of the hardware component. A symlink file located on the read only medium points to and triggers the activation of the symlink file on RAM. The first symlink file on RAM points to and selects the particular resource set as its object from among multiple available resources located on the read only medium. The selected resource is utilized to support the hardware component during operation of the data processing system.

21 Claims, 5 Drawing Sheets

METHOD AND SYSTEM OF DYNAMIC VIDEO DRIVER SELECTION ON A BOOTABLE CD VIA SYMBOLIC LINKS

BACKGROUND OF THE INVENTION

1. Technical Field

The present invention relates generally to data processing systems and in particular to video drivers of data processing systems. Still more particularly, the present invention relates to a method, system, and computer program product for dynamically selecting specific video driver resources from a read only bootable medium to support a particular video adapter/card of a data processing system.

2. Description of the Related Art

Data processing systems require hardware and software components to operate. In addition to the basic hardware components, such as the processor and memory, and software components, such as the operating system (OS), typical systems include a visual output mechanism that enables the user to view the applications and processes being run by the processor. Additionally, in order for the data processing system to begin operating, it must complete a boot up procedure by which the various hardware and software components are initialized for operation. For example, during a standard boot procedure, the boot program detects the memory capacity, the processor speed, and the type (or configuration) of Input/Output (I/O) devices, such as a mouse, keyboard and monitor.

Following the detection of these components, various component drivers (i.e., configuration files, etc.) are loaded into the system memory to enable the components to operate correctly. The drivers are computer programs that allow a specific hardware component to communicate with the OS or operating environment of the computer system. For example, a mouse driver is loaded into memory, corresponding to the specific mouse type detected. Also, a video driver is loaded corresponding to the operating characteristics of the video adapter/card detected. These operating characteristics are activated by the video capabilities supported by the OS and made available with the video driver (configuration files, etc.) loaded during boot up.

There presently exists many different types of OS, as well as many different types of display devices/video adapters and corresponding device drivers. Typically, each video adapter requires a unique set of configuration parameters (e.g., color counts and image resolution) and a unique video driver to operate properly. Thus, in most data processing systems, specific adapters are often provided and a corresponding device driver is required to support each hardware component that is connected to the system. With data processing systems utilized as server systems, for example, ServeRAID adapters are typically utilized. These server systems may range from the PC Server family of servers to the more current EServer family. Often, in servers that support these ServeRAID adapters, there is no OS installed on the hard drive and thus, a tool is needed to configure and maintain the ServeRAID adapters during the boot process and beyond. This tool is also required whenever a critical hard drive failure renders the operating system inoperable.

Thus, the ServeRAID configured systems provides an application called the ServeRAID Manager, which has a GUI interface that allows a user to interact with the ServeRAID adapters. The ServeRAID Manager is launched using a bootable CD running the Linux OS. This allows the user to configure the ServeRAID adapters before an operating system is installed on the hard drives or when a hard drive failure renders the operating system unusable.

The Linux OS comprises a graphical user interface (GUI), an X-Window System, and other components. The X-Window system is an open, cross platform, client/server system for managing a windowed graphical user interface in a distributed network.

Normally, when setting up a Linux installation, it is required for the user to choose an XServer that is compatible with the video adapter in the system. For example, if a user is installing X-Windows on a server that contains a S3 Incorporated S3Trio64V+video adapter, the user should configure the XF86_S3 Server since this is the server which works with this video adapter.

Linux makes use of symbolic links which are similar to shortcuts used in the Windows OS of Microsoft Corp. A symlink (symbolic link) is not a useful file by itself but points to another file, which is accessed when the symlink is accessed. Thus, when X-Windows starts, it searches for the file "/etc/X11/X". This file "points" to the XServer chosen by the user. X-Windows will load the server that /etc/X11/X points to and, therefore, it is important that /etc/X11/X points to the correct XServer. So, for the example above, the user would make /etc/X11/X point to /usr/X11R6/bin/XF86_S3 in order to load the XF86_S3 XServer when X-Windows starts.

The Linux-based boot CD must be able to run on many different servers which are configured using a range of different hardware devices. One such device which differs from server to server is the video adapter/card, which requires a specific video driver to display graphical representations. Many older servers use antiquated video devices, which do not work well with modern software, while newer servers use video adapters with all the latest features and which work well with today's software. The Linux bootable CD must work with all of these video adapters in order to properly boot the system and display the ServeRAID Manager GUI interface to the user. That is, the boot CD should be able to switch video drivers on the fly if the correct driver operation is desired.

However, the Linux boot CD is a read only CD, (i.e., it cannot be written to once manufactured). Thus, it is not possible to change /etc/X11/X symlink once the data has been burned into the CD and this prevents the applicable video driver from being properly selected during the boot process. When booting from a read only Linux CD, the symlink file can only point to a single generic driver or to a driver which may not work for a different video adapter on a different or the same server. Because the symlink file may only point to a single file and the boot CD cannot be written to, current boot CDs provide one generic video driver that is utilized to support the various different servers and video adapters found in the servers. In order to maintain compatibility with older video drivers, the generic driver may run with only 16 colors and VGA resolution (e.g., 640×480). However, with current systems, video adapters and monitors are well suited to display higher color counts and higher resolution in order to present a crisp user interface and a large desktop. A need exists for a way to provide hardware specific drivers and configuration utilities to maximize the display capabilities of each display device that may be encountered.

Previous approaches have attempted to provide hardware specific and/or dynamic driver selection. For example, U.S. Pat. No. 5,325,532 describes a way to generate a boot image based on current system configuration by retrieving device drivers from read only memory of the computer system (i.e., not a Linux boot CD ROM). Additionally, U.S. Pat. No. 5,325,532 describes a way to select and load a video driver based on current video system configuration by utilizing an intermediate video driver and a pass-through mechanism. However, neither of these approaches solves the inherent problem with a Linux read only boot CD or similar boot medium.

The present invention thus recognizes that it would be desirable to enable dynamic selection of an XServer and corresponding configuration files for a video adapter of a data processing system during boot up from a read only boot medium. A read only boot medium for a data processing system that is capable of providing specific, selectable video resources for the video adapter present in the data processing system would be a welcomed improvement. It would be further desirable to provide a method, system and program product by which a symlink file on a read only bootable medium is able to affect the dynamic selection of a particular XServer from a plurality of XServers on the read only boot medium. These and other benefits are provided by the invention described herein.

SUMMARY OF THE INVENTION

Disclosed is a method, system, and program product for enabling selection of appropriate, available resources for a hardware component of a data processing system during system boot via a read only medium. The method comprises various steps including first initiating a boot process from the read only medium on the data processing system. The type of hardware component is detected and then a copy of the symlink file is made on to the RAM of the data processing system. The object of a symlink file located on RAM is dynamically set to reflect the particular resource required for optimal operation of the detected hardware component. Thus, the symlink file located on the read only medium points to and triggers the activation of the symlink file on RAM. The first symlink file on RAM points to and selects the particular resource set as its object from among multiple available resources located on the read only medium. The selected resource is utilized to support the hardware component during operation of the data processing system.

One embodiment enables the dynamic selection of an XServer corresponding to a system video adapter during boot up of the system via a read only boot CD. The boot CD provides a list of selectable XServers to cover each possible adapter type. During the boot process, the boot code determines which video adapter is present in the system. A symlink file on the boot CD is made to point to a secondary symlink file on the RAM of the system during manufacturing. The second symlink file is created during the initial boot process and is dynamically modified to point to a correct XServer following the detection of the type of video adapter present. The second symlink file then points to the correct XServer and initializes that XServer on the boot CD.

In another embodiment, the boot CD also comprises a configuration type symlink file that points to a configuration file of the video adapter. According to this embodiment, the boot CD contains a list of selectable configuration files, each corresponding to different video adapters. A second symlink file is created on the RAM, which points to the correct configuration file following a detection of which video adapter is present in the system. The features of this embodiment may be completed independent/exclusive of the features of the XServer embodiment.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The present invention provides a method, system, and program product by which a boot sequence executing on a read only boot device, such as a CD ROM, is provided with the functionality to enable dynamic selection of both a correct XServer and a correct video configuration file of the specific video adapter/card of the data processing system being booted. As utilized herein, "correct" refers to the particular server and/or configuration file that provides optimal settings for the operation of the video adapter. Usually, the correct server and configuration file are known by the user and may be identified by the system when the video adapter is first installed. Depending on the list of available options, however, "correct" may refer to the most optimal among the available option and not necessarily the most optimal available in the industry for that adapter.

The invention is preferably executed on a data processing system such as the data processing system illustrated in FIG. 1A and described below. However, the invention finds applicability in most data processing systems including networked data processing systems (with specific server functionality). Particularly, the invention finds applicability in data processing systems operating with a Linux operating system (OS) and the X-Windowing features provided therein. Although, the various aspects and the features provided may be implemented in data processing systems with different OSs.

Figure 1A:
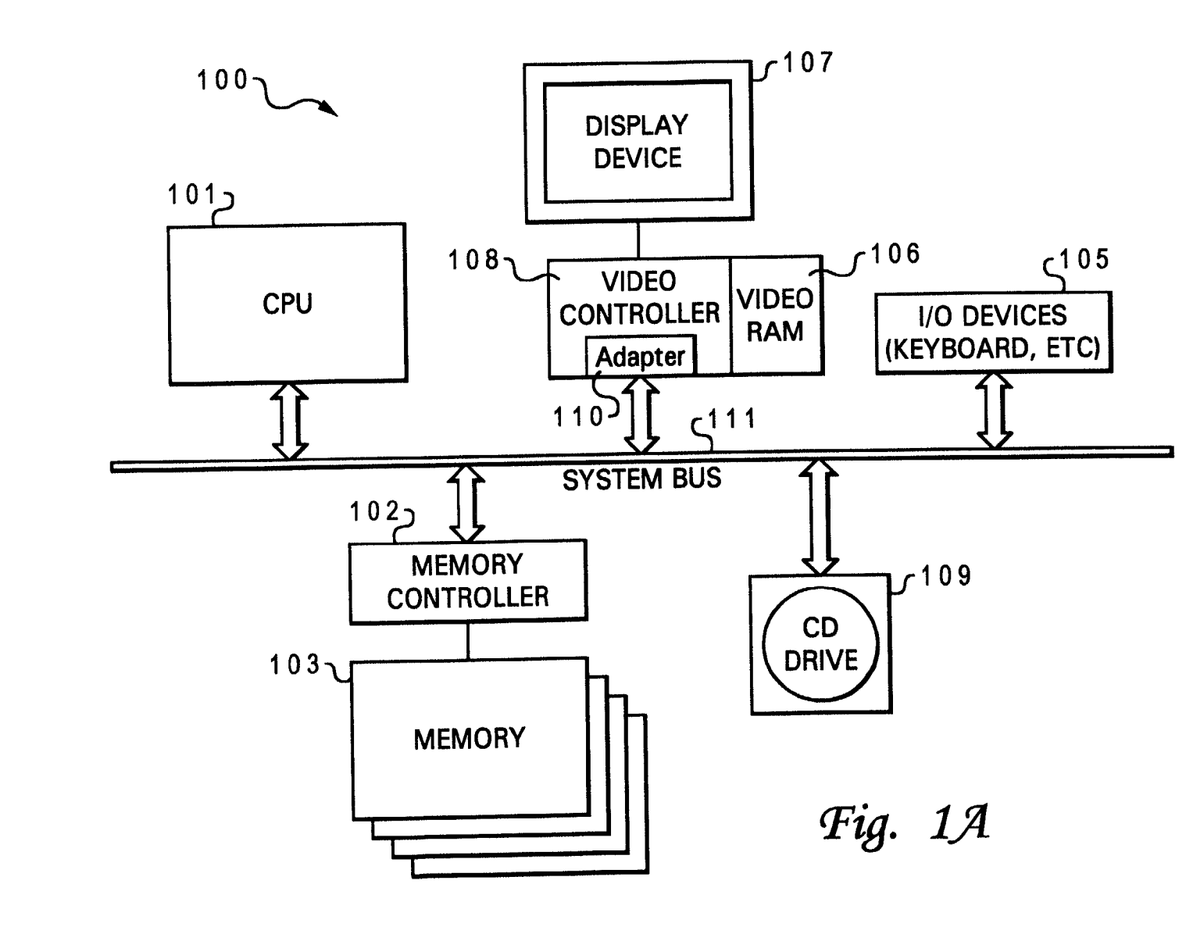
FIG. 1A is a block diagram illustrating core components and peripheral devices of a data processing system with which the preferred embodiment of the invention may be implemented.

With reference now to FIG. 1A, there is illustrated a data processing system in which a preferred embodiment of the invention may be implemented. Data processing system 100 comprises several major components, including CPU 101, I/O devices 105 and memory 103 (e.g., DIMM). CPU 101, I/O devices 105, and memory 103 are interconnected via a system bus 111 (which may be replaced by a switch fabric in other configurations). In order to properly execute related logic functions, memory 103 is coupled to various other devices via memory controller 102, which manages operations involving memory access and allocation/deallocation of memory 103. As illustrated, memory 103 consists of a RAID configuration, known within the art of data processing systems. RAID (Redundant Array of Independent Disks) is a series of hard disks on which data is stored in a redundant manner to improve performance and increase fault tolerance. A RAID system appears to the OS as a single logical hard disk and is controlled by a single adapter and controller.

In addition to the above components, data processing system 100 comprises a video subsystem, which includes video controller 108 and video RAM 106. Video RAM 106 is memory space utilized to temporarily buffer video images to be displayed. Memory 103 may comprise Read Only Memory (ROM) and Random Access Memory (RAM). RAM is the place in data processing system 100 where the OS, application programs and data in current use are kept so that they can be quickly reached by the system's processor. Also, according to the illustrative embodiment, RAM is utilized to temporarily store at least one secondary symbolic link (symlink) file that points back to the read only CD.

Video controller 108 is coupled to display device 107, which may be any one of a host of different display devices currently available. Each display device 107 via video controller 108 is capable of displaying graphics with a particular resolution determined by the designer of the device at manufacturing, and the video controller 108 requires particular configuration utilities to be assigned to it by the system during the boot process. Associated with video controller 108 is a video adapter 110. The video adapter 110 is a collection of software/firmware components, which permit signals generated by the executing applications executing on the CPU to be displayed in viewable format to a user.

Another component illustrated as part of data processing system 100 is Compact Disk Read Only Memory (or CD ROM) drive 109. CD ROM drive 109 is a peripheral component, which is ideally considered an input device, as it allows data and instructions to be inputted to the processing system. As the name implies, however, the disk media of the CDROM drive (typically referred to as a CD ROM or CD) is read-only and therefore cannot be written to. The features of the invention are particularly applicable to a read only medium utilized as a boot device. However, the features of the invention may be applied to a system having a Read/Write (RW) I/O device and/or a RW medium (for example, a RW CD ROM drive and a disk medium that allows data to be written to the boot device).

Although, the illustrated embodiment depicts only basic components of a data processing system interconnected via a system bus, it is understood that data processing system 100 maybe more complex. Data processing system 100 may comprise additional processing systems, with each processing system having additional components (or similar components with a different configuration). Component parts of data processing system may also be interconnected via other methods, such as a switch, for example. Presentation of a particular data processing system configuration is therefore not intended to limit the scope of the invention.

According to the invention, a Linux bootable CD is provided, which makes use of the X-Windows windowing system. Linux OS provides symbolic links (symlink), which points to another file that is executed whenever the symlink is executed.

Figure 1B:
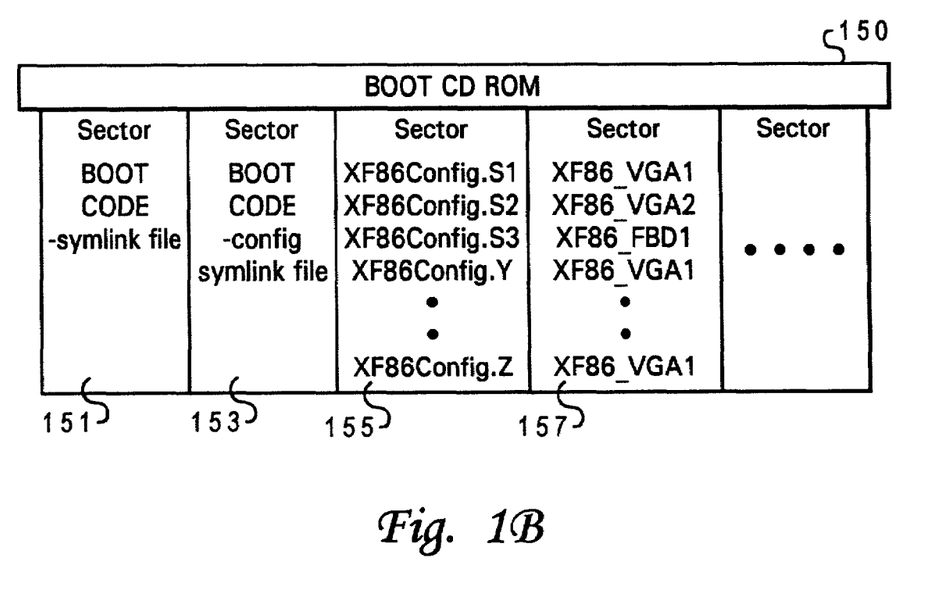
FIG. 1B is a block diagram illustrating sectors of a boot CD with data related to various XServers, configuration files, and boot code with symlink commands all utilized in an illustrative embodiment of the invention.

FIG. 1B illustrates sectors of a boot CD ROM with data related to the boot process and selection of video drivers, etc, utilized by the invention. The invention is preferably implemented in a data processing system, which utilizes a CD ROM medium to control its boot process and initialize its various components. Thus, CD ROM sectors includes sector 151 dedicated to boot code, sector 153 dedicated to OS initialization and configuration set up, sector 155 dedicated to selecting an XServer based on the available video adapter, and sector 157 dedicated to selecting a correct configuration file for video systems. The various sectors contain functional, software-encoded components. The exact configuration of the boot CD is not important to the correct implementation of the invention, so long as the boot CD comprises the relevant boot code (including symlink files) and lists of servers and configuration files utilized to complete the various processes of the invention as described below.

The primary component behind X-Windows is the XServer. The XServer is responsible for displaying the GUI to the user and can also be considered the video driver since it is responsible for drawing the GUI at a certain resolution and color depth specified by the user. As illustrated, the different XServers that each support various video adapters are provided within a sector 155 (or group of sectors) on the bootable CD. Thus, according to the present illustration, the specific XServer may be selected from XF86_VGA16, XF86_SVGA, XF86_FBDev, XF86_S3, XF86_Mach64, etc.

Figure 2A:
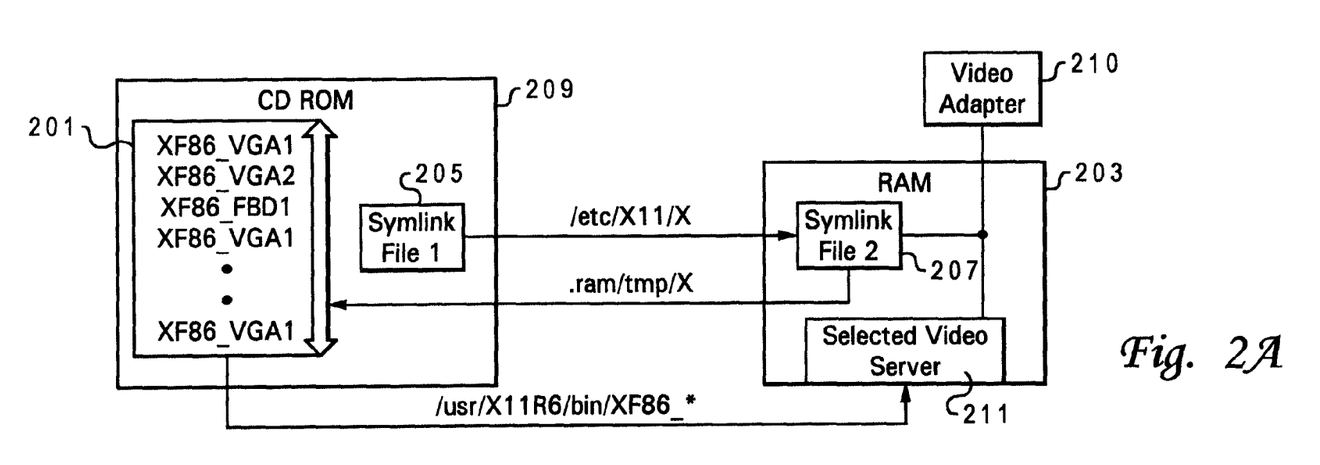
FIG. 2A is a block diagram illustrating the command flow for the server selection as a series of software-based transactions between a boot CD and RAM of data processing system of FIG. 1 in accordance with one embodiment of the invention.
Figure 2B:
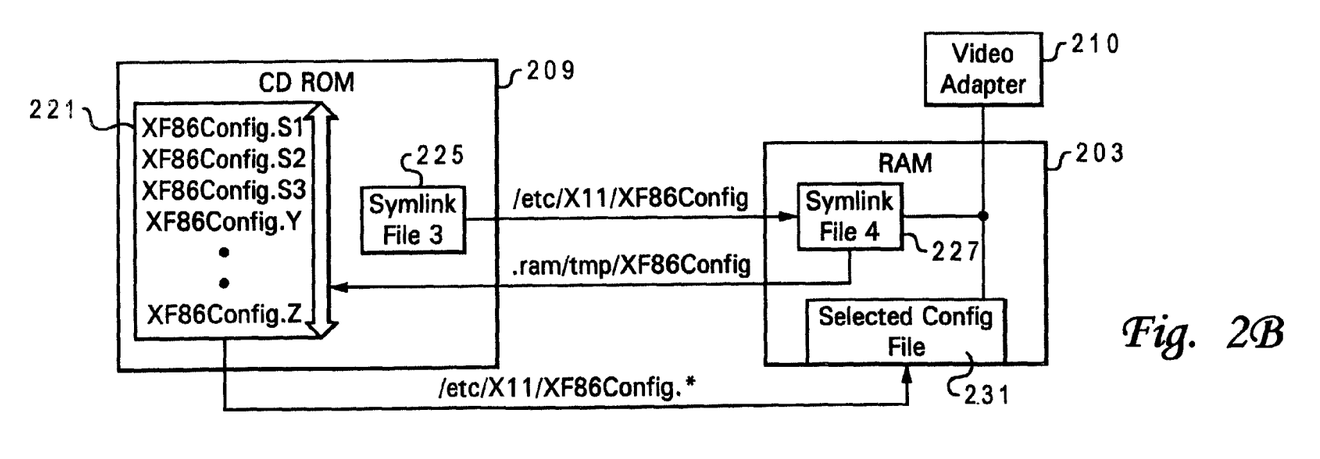
FIG. 2B is a block diagram illustrating the command flow for the configuration file selection as a series of software-based transactions between a boot CD and RAM of the data processing system of FIG. 1 in accordance with one embodiment of the invention.

FIGS. 2A and 2B are block diagrams illustrating specific software commands and or files within boot CD and RAM utilized when selecting correct XServers and correct video configuration files, respectively, according to the invention. The hardware component of interest in the illustrative embodiments is video adapter 210, which is described in FIG. 1A above. As shown in FIG. 2A, CD ROM comprises a symlink file 205 and a series of selectable XServers 201. Symlink file 205 has a communication link with second symlink file 207 within RAM 203. Within RAM 203 is a video server memory block that, in one embodiment, is updated with and stores the XServer parameters of the selected XServer from among the group of selectable XServers 201. In the preferred embodiment, however, the XServer information is maintained on the boot CD and RAM 203 does not store any of the video parameters utilized. Directional arrows indicate the directional flow of communication (i.e., instructions or data) between boot CD and RAM during implementation of the processes by which the correct video server is selected and activated.

When X-Windows starts the boot operation, it searches for the symlink file /etc/X11/X. In the preferred embodiment, this symlink file is modified during creation of the boot CD to "point" to a second symlink file on the RAM rather than directly to a pre-selected XServer on the boot CD. During normal operation, X-Windows loads the server which /etc/X11/X points to, so the invention involves first modifying the object to which the symlink file on the boot CD points so that it indirectly points to the correct XServer.

For example, if a user is installing X-Windows on a server which contains a S3 Incorporated S3Trio64V+video adapter, the user would configure the XF86_S3 Server since this is the server which works with this video adapter. So for example above, the user would require /etc/X11/X to point to /usr/X11R6/bin/XF86_S3 in order to load the XF86_S3 XServer when X-Windows starts.

In order to correctly select this XServer, the invention enables the user to dynamically configure a symlink file on the RAM to point to the desired XServer. However, the dynamic change of the object of the symlink file cannot be completed on the read only boot CD, and thus the invention provides code on the read only CD that creates an image of the symlink file on the RAM. The invention then taps into the functionality of the symlink file enabled by Linux and the write to capabilities of RAM to enable the object (the XServer) to which the symlink points to be changed to dynamically. Thus, the symlink file on the read only boot CD may indirectly support any and every video adapter the boot CD may encounter.

To overcome the fact that the boot CD is read only, the invention makes further use of features inherent to a symlink file coupled with the ability to write to an available RAM drive of the system. Thus, during manufacturing of the boot CD, the /etc/X11/X symlink burned into the CD is set to point to a similar symlink file on a RAM drive. Additional code is provided on the boot CD to automatically create a symlink file on the RAM drive. Code is also provided to enable changing of the object of the created symlink file by a user of the system. Thus, the user may dynamically change the object of the symlink file to point to the correct XServer.

Therefore, as illustrated in FIG. 2A, /etc/X11/X points to the file /.ram/tmp/X. The /.ram directory is created within RAM when the boot process of the bootable CD commences. The file /.ram/tmp/X is another symlink file, which unlike the original symlink file, may be changed dynamically because it is on the RAM drive, which is a writable medium. Accordingly, /.ram/tmp/X may be set (by the user) to point to the correct XServer that is available on the boot CD. A communication is thus established from the symlink on the boot CD to the symlink on the RAM drive back to the selected XServer on the boot CD. From the above example, the /etc/X11/X file triggers the /.ram/tmp/X file which then points to and selects the /usr/X11R6/bin/XF86_S3 file.

Figure 3:
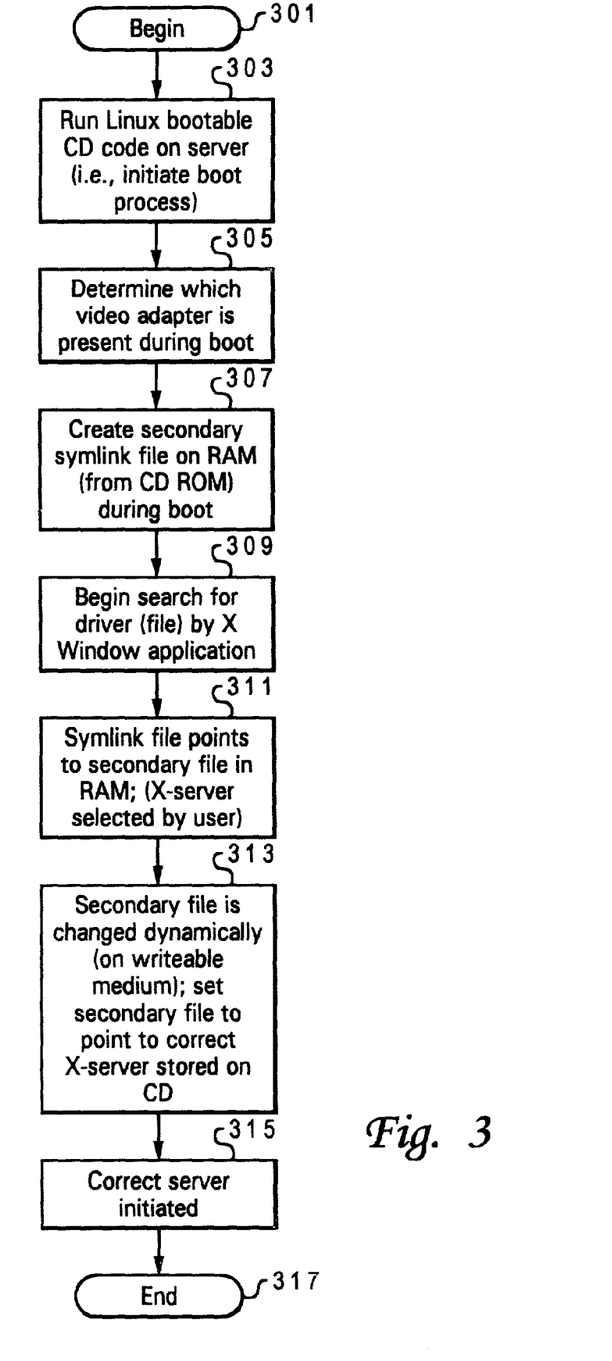
FIG. 3 is a flow chart of the process by which a correct XServer is selected from a read only boot CD during implementation of one embodiment of the invention.

FIG. 3 illustrates the process by which the correct server is dynamically selected from among multiple possible servers on a read only bootable medium. The process begins at block 301 and thereafter proceeds to block 303, which illustrates a boot code from a Linux bootable CD being executed. The boot code detects and determines which video adapter is present or affiliated with the system at block 305. Then, the boot code automatically creates a secondary symlink file on the RAM as shown at block 307. The secondary symlink file is dynamically changeable and is utilized to select a specific XServer from among a list of servers provided on the boot CD. Simultaneously with the creation of the secondary symlink file, the object of the secondary symlink file is set to point to a specific XServer from among the list of XServers provided on the boot CD. The specific XServer corresponds to the XServer required for the adapter to operate correctly. An X-Window application/process is initiated to find the correct XServer as shown at block 309. To complete this process, the symlink file on the boot CD is executed, points to and triggers the secondary symlink file created in RAM as shown at block 311. The secondary symlink file is then executed and points to and selects the specific XServer from the boot CD as shown at block 313. This activates the specific XServer file to provide XServer support for the video adapter while the system is operating as shown at block 315. Then the process ends as indicated at block 317.

In another embodiment, the features of the invention are extended to also select the configuration (config) file required by the video system based on the XServer selected. To configure the XServer, the file /etc/X11/XF86Config file is modified. The configuration file is used to describe the video hardware to the XServer and to set the parameters desired by the user such as video resolution and color depth. When the XServer starts, it looks for this configuration file on the boot CD and reads the configuration information stored within. XServer specific information is stored within the XF86Config file and utilized by the XServer, so it is important that the XF86Config file contain the correct information for the particular XServer that is being used.

Also, because the same XF86Config file cannot be used by every XServer, it is necessary that the XF86Config be changed based on the XServer being used. As with the situation involving the symlink file described above, the boot CD-ROM is read-only and only one pre-selected XF86Config file is operational during the initial boot. Similar to the above example, the invention modifies the /etc/X11/XF86Config file to create a configuration symlink which points to the RAM drive. A corresponding /etc/X11/XF86Config file is created on the RAM drive with a selectable object. The object of the second /etc/X11/XF86Config file is dynamically changed to point to the correct XF86Config file available on the boot CD. Thus, like the XServer example, and as illustrated in FIG. 2B, communication is established between the boot CD and RAM and the configuration symlink files are utilized to initiate selection of the correct configuration file. Communication is established from /etc/X11/XF86Config to /.ram/tmp/XF86Config and then to /etc/X11/XF86Config.S3, where .S3 represents the object that was dynamically selected for the configuration symlink on RAM.

FIG. 2B illustrates a similar software communication model between boot CD and RAM as FIG. 2A. Similar components share the same reference numerals and are described with FIG. 2A. However, in FIG. 2B a series of selectable configuration files 221 replaces the XServer list of FIG. 2A. Also, configuration symlink file 3 225 initiates configuration symlink file 4 227 and RAM 203 comprises a memory block 231 which holds the data/information of the selected configuration file. As shown in FIG. 1B, both the list of servers and the list of configuration files may be provided on a single boot CD, although the invention contemplates that either list and the functional features by which an item is selected from either list and activated may be selected/activated exclusively and independently of the other. Using the functional features of the invention, the XF86Config file is changed dynamically at boot time based on the video adapter and XServer being used.

Figure 4:
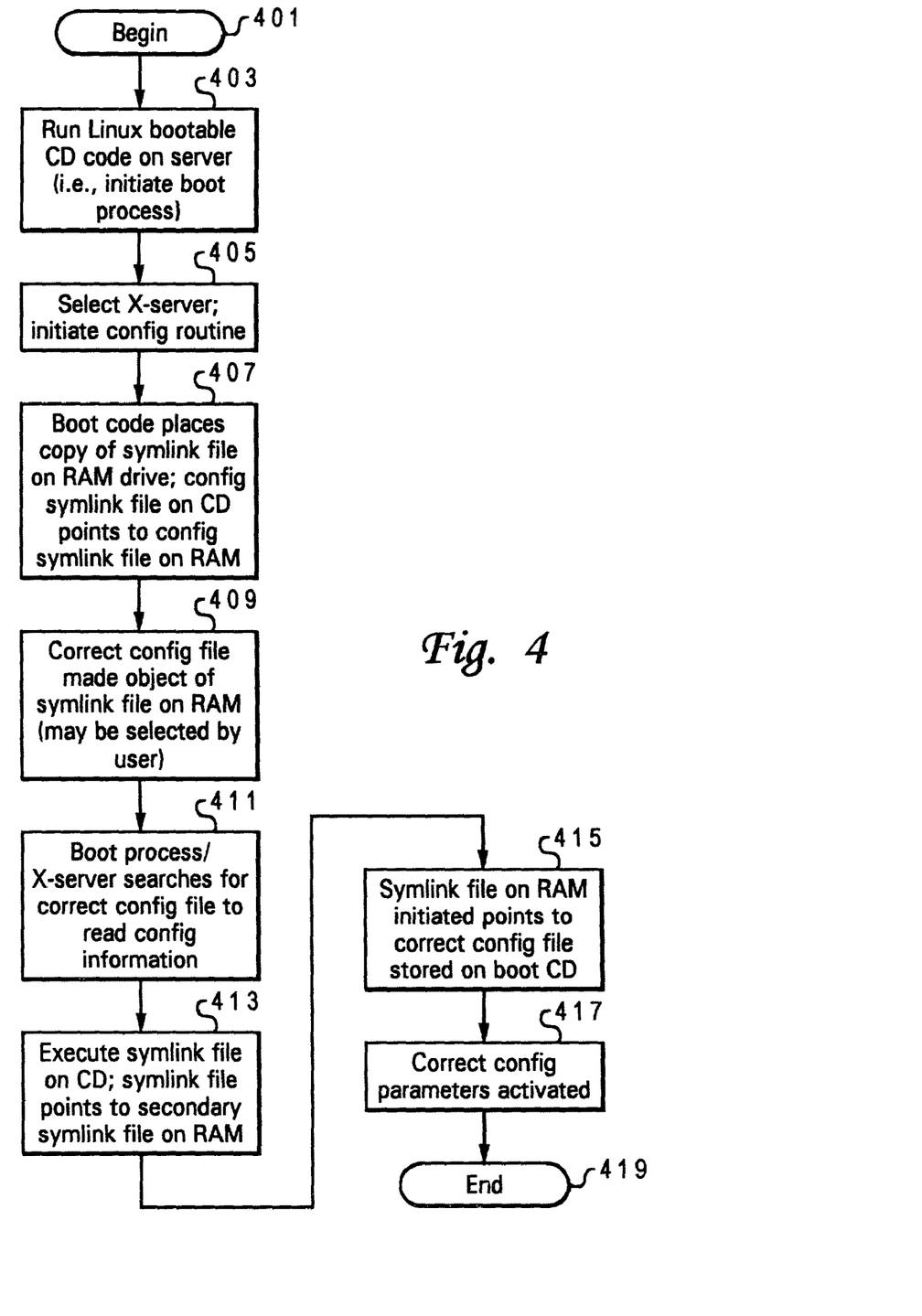
FIG. 4 is a flow chart of the process by which a correct video configuration file is selected from a read only boot CD during implementation of one embodiment of the present invention.

FIG. 4 illustrates the process by which the correct video configuration file is dynamically selected from among multiple possible configuration files on a read only boot medium. The process flow of FIG. 4 is similar to that of FIG. 3; however, as stated above, the process involves selection of the correct configuration file and not of the correct XServer. Thus, the process begins at block 401 and thereafter proceeds to block 403, which illustrates a boot code from a Linux bootable CD being executed. The correct XServer is then identified and a configuration file selection routine for that XServer initiated as shown at block 405. Identification of the XServer may be completed according to the process described above in FIG. 3 or any other process. In one embodiment, the process includes a step at which the boot code determines which video adapter and XServer is present or affiliated with the system. The boot code automatically creates a secondary configuration symlink file on the RAM as shown at block 407. The secondary configuration symlink file is dynamically changeable and is utilized to select a specific configuration file from among a list of configuration files provided on the boot CD. Following the identification of the correct adapter and XServer and the copying of the secondary configuration symlink file to RAM, the object of the secondary configuration symlink file is set to point to a specific configuration file from among the list of configuration files provided on the boot CD, as depicted at block 409. The specific configuration file corresponds to the configuration file required for the XServer and video adapter to operate correctly. Following, the boot code executes to a configuration symlink file to find the correct configuration file as indicated at block 411. The configuration symlink file on the boot CD is executed and points to and initiates the secondary configuration symlink file created in RAM as shown at block 413. The secondary configuration symlink file points to and selects the correct configuration file from the boot CD as shown at block 415. This activates the configuration file to provide configuration support for the XServer and video adapter while the system is operating as shown at block 417. Then the process ends as indicated at block 419.

Several functional obstacles are overcome by the invention including: (1) enabling the /etc/X11/X symlink on a read only medium to point to a selectable XServer. Previously the symlink could only point to one XServer and if this XServer did not work for the video adapter present, then the boot process would fail, and (2) enabling dynamic user selection from a read-only medium (CD-ROM). Enabling the read only bootable CD to support a wide range of hardware configurations found on the servers. This further allows the read only boot CD to maintain compatibility with every server in the Netfinity portfolio.

It is also noted above that the invention may be completed on systems that are not booted with a read only medium. This may be desired for all Linux boot operations from any medium because the creator of the boot medium will not know if the medium can be written to since the CD ROM drive may or may not support write operations, irrespective of whether the medium is read only or read/write capable. Also, even if a default server is utilized, (i.e., no dynamic server selection is enabled) the dynamic, configuration file selection process may still be completed and vice versa.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer system for enabling selection of appropriate, available resources for a hardware component of a data processing system, said computer system comprising code that when executed on the computer system provides:
    means for detecting a type of said hardware component during system boot of the data processing system via a read only medium (ROM);
    means for dynamically creating a RAM symlink file on a RAM of said data processing system, wherein said RAM symlink file includes functionality for responding to a receipt of an activation trigger by pointing to a selected resource file on said read only medium that enables correct operation of said type of said hardware component;
    means for dynamically selecting the resource file on the ROM from among multiple available resources located on said ROM and setting an object of the RAM symlink file to the selected resource file;
    means for triggering the activation of said RAM symlink file using a ROM symlink file on said read only medium, wherein the ROM symlink file is pre-programmed with the address of the RAM symlink file as its object and said ROM symlink file is executed during said system boot via the ROM to trigger/activate its object file, which is the RAM symlink file;
    means, responsive to receipt of the activation from the ROM symlink file by the RAM symlink file, for selecting, via said RAM symlink file, the object of the RAM symlink file which object is the selected resource;
    means for linking said selected resource to support said hardware component during operation within said data processing system;
    wherein said selected resource has a particular configuration file that is preferred and said RAM and ROM symlink files are first and second symlink files, respectively, said system further comprising code that when executed provides:
        means for creating a third symlink file on said RAM;
        means for determining which configuration file is preferred for said selected resource from among multiple configuration files available for selection on said ROM;
        means, responsive to the determination of a preferred configuration file, for setting an object of said third symlink file to said preferred configuration file; and
        means for activating an execution of said third symlink file, wherein said preferred configuration file is selected for said resource during operation of said particular type of hardware component.

2. The computer system of claim 1, further comprising code that when executed on the computer system provides means for first initiating a boot process from said read only medium on said data processing system.

3. The computer system of claim 1, wherein said hardware component is a video driver and said resource is an Xserver, and said selecting means selects a particular XServer from among a plurality of XServers, wherein said selected XServer is a preferred XServer for the particular type of said video driver.

4. The computer system of claim 3, wherein said selected XServer has a particular configuration file that is preferred, said computer system further comprising code that when executed provides:

means for creating a third symlink file on said RAM;

means for determining which particular configuration file is preferred for said selected XServer from among multiple configuration flies available for selection on said read only medium;

means, responsive to the determination of a particular configuration file, for setting an object of said third symlink file to said particular configuration file; and means for activating an execution of said third symlink file, wherein said particular configuration file is selected for said XServer during operation of said particular type of hardware component.

5. The computer system of claim 1, wherein said resource is a configuration file, and said selecting means selects a particular configuration file from among a plurality of configuration files located on said read only medium, wherein a selected configuration file is a preferred configuration file for said type of said hardware component.

6. The computer system of claim 1, wherein said resource comprises a particular XServer and a particular configuration file, wherein:

said creating means creates a third symlink file on said RAM;

said dynamically setting means includes means for dynamically setting a first object of the RAM symlink file to the particular XServer and dynamically setting a second object of the third symlink file to the particular configuration file, both required for a correct operation of said hardware component;

said selecting means includes means for respectively selecting said particular XServer and said particular configuration file from among multiple available XServers and configuration files located on said read only medium that corresponds to said first object and said second object, respectively; and said linking means links said selected XServer and configuration file to support said hardware component during operation of said data processing system.

7. The computer system of claim 1, wherein said read only medium is a CD ROM and said ROM symlink file is a boot CD symlink file.

8. A computer program product comprising:

a tangible computer readable medium;

program code on said tangible computer readable medium for enabling selection of appropriate, available resources for a hardware component of a data processing system during system boot via a read only medium, said program code comprising code for:

detecting a type of said hardware component during system boot of the data processing system via the read only medium (ROM);

dynamically creating a RAM symlink file on a RAM of said data processing system, wherein said RAM symlink file includes functionality for responding to a receipt of an activation trigger by pointing to a selected resource file on said read only medium that enables correct operation of said type of said hardware component;

dynamically selecting the resource file on the ROM from among multiple available resources located on said ROM and setting an object of the RAM symlink file to the selected resource file;

triggering the activation of said RAM symlink file using a ROM symlink file on said read only medium, wherein the ROM symlink file is pre-programmed with the address of the RAM symlink file as its object and said ROM symlink file is executed during said system boot via the ROM to trigger/activate its object file, which is the RAM symlink file;

responsive to receipt of the activation from the ROM symlink file by the RAM symlink file selecting, via said RAM symlink file, the object of the RAM symlink file which object is the selected resource;

linking said selected resource to support said hardware component during operation within said data processing system;

wherein said selected resource has a particular configuration file that is preferred and said RAM and ROM symlink files are first and second symlink files, respectively, said program code further comprising code for;

creating a third symlink file on said RAM;

determining which configuration file is preferred for said selected resource from among multiple configuration files available for selection on said ROM;

responsive to the determination of a preferred configuration file, setting an object of said third symlink file to said preferred configuration file; and activating an execution of said third symlink file, wherein said preferred configuration file is selected for said resource during operation of said particular type of hardware component.

9. The computer program product of claim 8, further comprising program code for:

first initiating a boot process from said read only medium on said data processing system.

10. The computer program product of claim 8, wherein said hardware component is a video driver, said resource is an XServer, and said program code for selecting includes code that selects a particular XServer from among a plurality of XServers, wherein said selected XServer is a preferred XServer for the particular type of said video driver.

11. The computer program product of claim 10, wherein said selected XServer has a particular configuration file that is preferred, said computer program product further comprising program code for:

creating a third symlink file on said RAM;

determining which particular configuration file is preferred for said selected XServer from among multiple configuration files available for selection on said read only medium;

responsive to said determining step, setting an object of said third symlink file to said particular configuration file; and activating an execution of said third symlink file, wherein said particular configuration file is selected for said XServer during operation of said particular type of hardware component.

12. The computer program product of claim 8, wherein said resource is a configuration file, and said program code for selecting includes code that selects a particular configuration file from among a plurality of configuration files located on said read only medium, wherein a selected configuration file is a preferred configuration file for said type of said hardware component.

13. The computer program product of claim 8, wherein said resource comprises a particular XServer and a particular configuration file, wherein:

said program code for creating creates a third symlink file on said RAM;

said program code for dynamically setting includes code for dynamically setting a first object of the RAM symlink file to the particular XServer and dynamically setting a second object of the third symlink file to the particular configuration file, both required for a correct operation of said hardware component;

said program code for selecting includes code for respectively selecting said particular XServer and said particular configuration file from among multiple available XServers and configuration files located on said read only medium that corresponds to said first object and said second object, respectively; and said program code for linking links said selected Xserver and configuration file to support said hardware component during operation of said data processing system.

14. The computer program product of claim 8, wherein said read only medium is a CD ROM and said ROM symlink file is a boot CD symlink file.

15. A method for enabling selection of appropriate, available resources for a hardware component of a data processing system during system boot via a read only medium, said method comprising:

detecting a type of said hardware component during system boot of the data processing system via the read only medium (ROM);

dynamically creating a RAM symlink file on a RAM of said data processing system, wherein said RAM symlink file includes functionality for responding to a receipt of an activation trigger by pointing to a selected resource file on said read only medium that enables correct operation of said type of said hardware component;

dynamically selecting the resource file on the ROM from among multiple available resources located on said ROM and setting an object of the RAM symlink file to the selected resource file;

triggering the activation of said RAM symlink file using a ROM symlink file on said read only medium, wherein the ROM symlink file is pre-programmed with the address of the RAM symlink file as its object and said ROM symlink file is executed during said system boot via the ROM to trigger/activate its object file, which is the RAM symlink file;

responsive to receipt of the activation from the ROM symlink file by the RAM symlink file selecting, via said RAM symlink file, the object of the RAM symlink file which object is the selected resource;

linking said selected resource to support said hardware component during operation within said data processing system;

wherein said selected resource has a particular configuration file that is preferred and said RAM and ROM symlink files are first and second symlink files, respectively, said method further comprising:

creating a third symlink file on said RAM;

determining which configuration file is preferred for said selected resource from among multiple configuration files available for selection on said ROM;

responsive to the determination of a preferred configuration file, setting an object of said third symlink file to said preferred configuration file; and activating an execution of said third symlink file, wherein said preferred configuration file is selected for said resource during operation of said particular type of hardware component.

16. The method of claim 15, further comprising:

first initiating a boot process from said read only medium on said data processing system.

17. The method of claim 15, wherein said hardware component is a video driver, said resource is an XServer, and said selecting step selects a particular XServer from among a plurality of XServers, wherein said selected XServer is a preferred XServer for the particular type of said video driver.

18. The method of claim 17, wherein said selected XServer has a particular configuration file that is preferred, said method further comprising:

creating a third symlink file on said RAM;

determining which particular configuration file is preferred for said selected XServer from among multiple configuration files available for selection on said read only medium;

responsive to said determining step, setting an object of said third symlink file to said particular configuration file; and activating an execution of said third symlink file, wherein said particular configuration file is selected for said XServer during operation of said particular type of hardware component.

19. The method of claim 15, wherein said resource is a configuration file, and said selecting step selects a particular configuration file from among a plurality of configuration files located on said read only medium, wherein a selected configuration file is a preferred configuration file for said type of said hardware component.

20. The method of claim 15, wherein said resource comprises a particular XServer and a particular configuration file, wherein:

said creating step creates a third symlink file on said RAM;

said dynamically setting step includes dynamically setting a first object of the RAM symlink file to the particular XServer and dynamically setting a second object of the third symlink file to the particular configuration file, both required for a correct operation of said hardware component;

said selecting step includes respectively selecting said particular XServer and said particular configuration file from among multiple available XServers and configuration files located on said read only medium that corresponds to said first object and said second object, respectively; and said linking step links said selected XServer and configuration file to support said hardware component during operation of said data processing system.

21. The method of claim 15, wherein said read only medium is a CD ROM and said ROM symlink file is a boot CD symlink file.

* * * * *